Oct. 11, 1927.
C. W. HUMPHREY ET AL
1,645,142
PROCESS OF SOLIDIFYING ALUMINUM CHLORIDE
Original Filed May 29, 1923    4 Sheets-Sheet 1
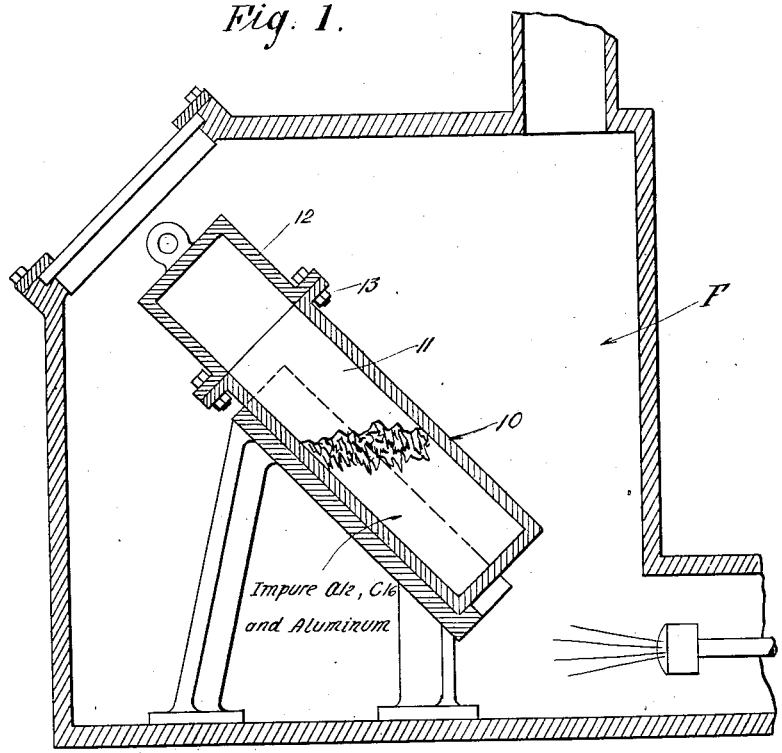
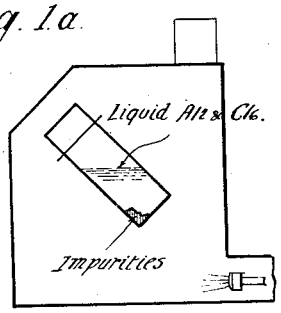
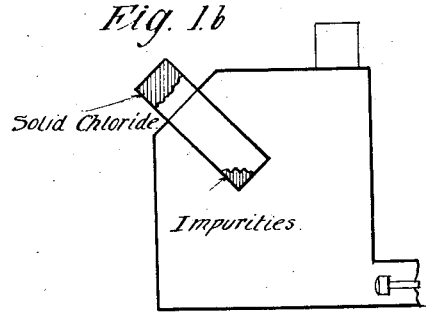
Inventors.
Clifford W. Humphrey
Donald S. McKittrick
by
Attorney.

Oct. 11, 1927.  
C. W. HUMPHREY ET AL  
1,645,142  
PROCESS OF SOLIDIFYING ALUMINUM CHLORIDE  
Original Filed May 29, 1923   4 Sheets-Sheet 2

Inventors.
Clifford W. Humphrey
Donald S. McKittrick.
Attorney.

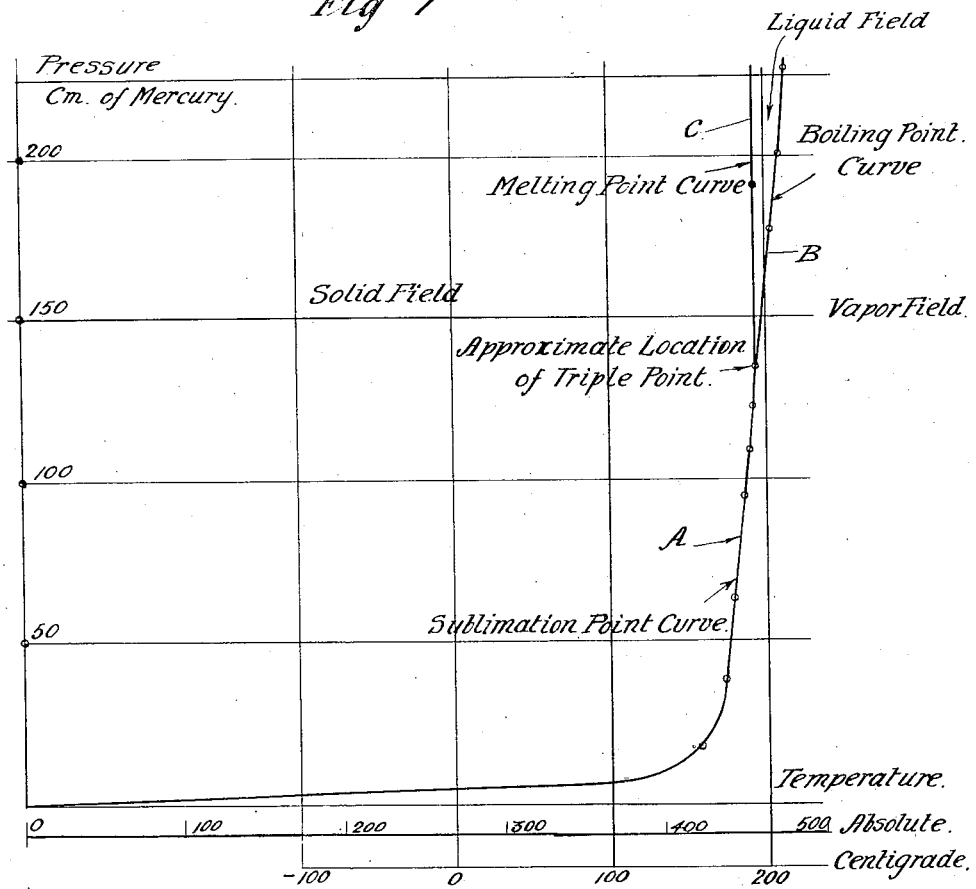

Patented Oct. 11, 1927.

1,645,142

UNITED STATES PATENT OFFICE.

CLIFFORD W. HUMPHREY, OF REDBANK, NEW JERSEY, AND DONALD S. McKITTRICK, OF OAKLAND, CALIFORNIA, ASSIGNORS TO CLIFFORD W. HUMPHREY, OF SAN FRANCISCO, CALIFORNIA, AND HENRY I. LEA, OF SANTA MONICA, CALIFORNIA.

PROCESS OF SOLIDIFYING ALUMINUM CHLORIDE.

Application filed May 29, 1923, Serial No. 642,210. Renewed August 18, 1927.

This invention has to do with the solidification of such substances as aluminum chloride; that is, of such substances as are capable of solidification by the operations hereinafter described. The invention is not necessarily restricted in its broader sense to the solidification specifically of aluminum chloride; but the invention will be fully understood from the following detailed description dealing with aluminum chloride. For instance, the process may be used for the formation of a homogenious mixture or compound of two or more chlorides solidified into a cake or other desired forms. Iron chloride, for instance, may be mixed in the desired proportion with the aluminum chloride before the compounds are charged into the operating bomb; and the result will be a homogenious product, in solid cake or other form, as desired. We speak in particularity of iron chloride because for use in some processes it may be desirable to have a substance that contains aluminum chloride and iron chloride in certain proportions. A mixture of aluminum chloride and iron chloride will have liquefying and boiling points somewhat different from those of aluminum chloride alone, but the invention will be fully understood from the following description as applied more specifically to aluminum chloride.

The invention forming the subject matter of the following specification and claims is connected more or less closely with other inventions for which other applications are being filed by us. The claims appended hereto are directed particularly to the solidification of aluminum chloride or the like into a condensed cake. This solidification process—the steps by which solidification is obtained—also play a part in a process of purification of such substances as aluminum chloride, to which a co-pending application, method of purifying aluminum chloride, Serial No. 642,676, filed May 31st 1923, is directed; and said purification process also forms a part of another process invention directed more particularly to the making of chemically pure alumina, which process is also the subject matter of another co-pending application, process of producing pure alumina, Serial No. 642,211, filed May 29th, 1923. And the apparatus set out in this following specification is likewise the particular subject matter of another co-pending application, apparatus for purifying and solidifying aluminum chloride, Serial No. 642,677, filed May 31st, 1923.

Consequently, the present specification and claims deal with the process for condensing aluminum chloride or other similar compounds into a solid cake. It will be unnecessary for us to set out fully the various reasons why it is desirable to have aluminum chloride in the form of a solid cake. Aluminum chloride is ordinarily obtainable commercially in granular or crystalline form, and is very susceptible to deterioration. In solid cake form we have found that the deterioration is very much less, due perhaps to the very much smaller surface area.

We have determined a peculiarity in the action of aluminum chloride under the influence of heat and pressure (more particularly its own vapor pressure). Ordinarily aluminum chloride has been considered as a compound that, when heated, will vaporize immediately from its solid state, and when cooled will sublime directly from vapor to solid in finely divided or crystalline form. We have found that when aluminum chloride is heated under pressure, its own vapor pressure for instance, a point of temperature and pressure is reached at and above which the body of aluminum chloride is held in liquid state and may be made to solidify from that state or may be made to pass from vapor state through the liquid state into the solid state; and we make use of these peculiar properties in the production of a final solid cake of aluminum chloride, all as will be explained more in detail, together with illustrations of various apparatus for carrying on the process. The apparatus for carrying on this process consists essentially of a bomb able to withstand the pressure and the chemical action of the aluminum chloride; the bomb operating as having two chambers or sections, one of which contains the original charge and is heated throughout the operation, the other of which is either at first shut off from the charge holding section or else is maintained at least equally heated, and preferably in a position such that any vapors entering from the charge containing chamber will remain vapors and be returned to that chamber. And the second chamber is, after liquefaction of the aluminum chloride in the charge chamber, kept cool, and in communication with the charge holding chamber, and in such a position that the solid cake formed by condensation of the vapors will remain in the second chamber as formed. In order to make the method more clear and effectively intelligible we will now first refer to the accompanying drawings.

Fig. 1 is a vertical section showing a simple form of apparatus that may be used for the process, showing the bomb in its position at the start of the operation;

Fig. 1$^a$ is a similar but diagrammatic view showing the next step of the process;

Fig. 1$^b$ is a similar view showing the final step of the process;

Fig. 7 is a diagram illustrating the temperature-pressure characteristics of aluminum chloride.

Figure 2:
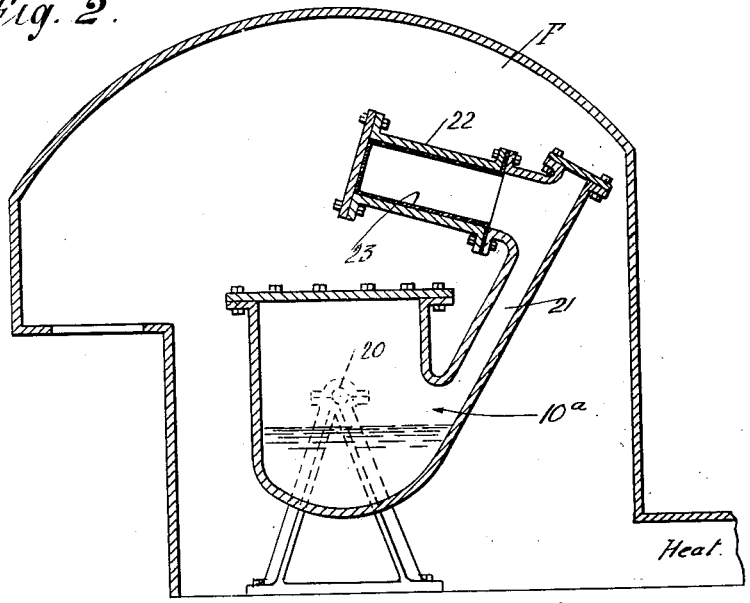
Fig. 2 is a vertical section showing another form of apparatus.

We will explain first the discovered peculiarities of aluminum chloride when heated under pressure, and for this purpose refer more particularly to Fig. 7. When we heat aluminum chloride under its own vapor pressure we have carried it, so to speak, along the line A of the diagram. This line A of the diagram represents the temperature-pressure characteristic of the aluminum chloride as regards its change from solid to vapor state. If the temperature is raised to a point, which we have found to be a little less than 200° C., we reach the point marked "triple point" in the diagram. At this point the characteristic curve A branches into two curves B and C, curve B being substantially a continuation of curve A, and curve C rising substantially vertically in the diagram, where temperature is plotted horizontally and pressure vertically. If we carry the temperature of the aluminum chloride up above the triple point we have then carried the aluminum chloride into what may be termed the "region of 2 phase fluid". In this region above the triple point the curve B represents the temperature-pressure characteristic between the vapor and liquid fields, while the curve C represents the temperature-pressure characteristic between the liquid and solid fields. When we heat the aluminum chloride to a temperature above the triple point the vapor pressure establishes equilibrium so that the body of aluminum chloride is held liquid. And if, while maintaining the same pressure, or at least without reducing the pressure corresponding with the reduction in temperature, we make a sufficient reduction in temperature of the vapors, the vapors will then pass through the liquid phase into the solid phase. For instance, referring to the diagram, if we are holding a temperature of about 210° C. we will have a corresponding vapor pressure of 200 cm. Now if we hold that same pressure and reduce the temperature of the vapors to say 200° C., it will be readily seen that the vapors will be condensed into liquid, because, at a pressure of 200 cm. it will be seen that the temperature of 200° C. lies in the liquid field between lines B and C. If we again reduce the temperature of the liquid condensate to say 180° C., still maintaining the same pressure on the vapors and on the liquid condensate, we will then carry the liquid condensate into the solid field to the left of curve C, and the condensate will solidify. We have found that when solidification takes place from the liquid state a solid cake is formed, whereas when solidification takes place directly from the vapor state (without passing through the liquid state, as occurs when the chloride is at a temperature below the triple point), a finely divided crystalline solid is formed. The present invention therefore deals with a process for carrying aluminum chloride or a similar compound through its liquid state on the way to solidification.

However, if the vapor is suddenly cooled, the product will be condensed either with or without passing through the liquid state depending on the rate of cooling, which will govern the path to be followed in the diagram of Fig. 7. In order to get a solid cake the chloride must be in liquid state throughout before solidifying.

The process we are now about to describe may deal with impure aluminum chloride or pure aluminum chloride, for the solidification of either. The process of our copending application entitled "Process of purifying aluminum chloride" deals more particularly with the steps that result in freeing the aluminum chloride from impurities, and also incidentally solidifying it. But the present process may be used for solidifying either pure or impure aluminum chloride, or any compound having similar characteristics. Consequently, in this specification we will say nothing of the purification of the aluminum chloride.

Using the simple form of apparatus shown in Figs. 1, 1$^a$ and 1$^b$, the aluminum chloride is introduced into bomb 10 to occupy the position indicated in Fig. 1. The bomb is placed in furnace F in the position shown in Fig. 1 so that the whole bomb may be heated to a temperature of from say 200° C. to 300° C. This temperature is kept up for a sufficient period to volatilize and liquefy the chloride, so that then we have the body of aluminum chloride held liquid under its own vapor pressure. This condition is shown in Fig. 1ᵃ. Any impurities that will not liquefy or vaporize will fall to the bottom of the bomb; and thus certain kinds of impurities may be separated even though no special attempt is made in this particular process to purify the aluminum chloride.

Then the bomb is put into the position shown in Fig. 1ᵇ so that its upper end, its upper chamber 12, will extend beyond the furnace and will thereby be cooled (usually to a temperature low enough to carry the aluminum chloride through the liquid state into the solid state). Consequently, because the temperature in the furnace is still being kept up, we have modified the conditions by lowering the temperature of the vapors in chamber 12 without greatly lowering the vapor pressure. Hence, we have a condition in chamber 12 that carries the aluminum chloride at nearly the same pressure to a lower temperature and therefore carries the aluminum chloride through the liquid form to its solid form. The temperature in furnace F, and of chamber 10 and the body of liquid chloride, is kept up; and thus, as vapor is caused to condense first into the liquid and then into the solid form in chamber 12, more vapor is constantly being produced in chamber 10. This action is kept up until all the vapors are finally condensed and finally deposited in solid form in chamber 12; so that at the end of this operation we have the entire body of aluminum chloride in a solid cake in chamber 12.

The inclination of the bomb is such that the solidified deposit at the upper end is well above any impurities that may be left in the lower end and is also, during the operation, out of contact with the liquid body in the lower end of the bomb. But the inclination is insufficient to cause the solidified deposit to drop to the lower end. The bomb is of course, constructed so as to withstand the pressures involved in the process, and is also constructed to withstand chemical action of the aluminum chloride. For instance, it may be made as a whole of any suitable material that is not susceptible to reaction with the chloride, for instance, of glass or fused silica; or as we find most convenient it may be made of metal lined with enamel or other non-reactive material. The bomb may be conveniently made in two parts 11 and 12, secured together by any suitable releasable fastening, as by the flange and bolt arrangement shown at 13. This is for convenience in charging and in removing the solidified product. Also as hereinafter explained, the receiving chamber 12 of the bomb may have an inner container for reception of the purified aluminum chloride. This simple form of bomb and its operation illustrate the principle of the apparatus and the method that may be carried out in many different forms of apparatus by somewhat modified procedures.

Figure 3:
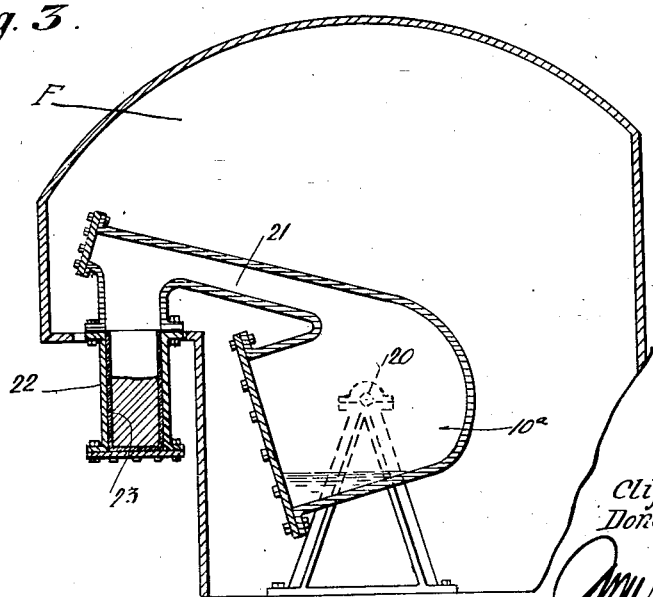
Fig. 3 is a similar vertical section showing another form of apparatus of Fig. 2 in position to distill the purified aluminum chloride over into the container provided for that purpose.

In Figs. 2 and 3 we show a bomb 10ᵃ pivoted at 20 so that it may be moved between the positions shown in Figs. 2 and 3. This bomb has a neck 21 connecting with the removable condensing chamber 22. This chamber is so related to the main chamber of the bomb that, when in the position shown in Fig. 2, in the furnace F, chamber 22 is above the main chamber of the bomb and is in such a position that no condensate can gather in it. When in the position of Fig. 3, chamber 22 is outside furnace F and extends downwardly from the end of neck 21. In this position, and cooled by being exterior of the furnace, it is in condition to receive the chloride condensate. The operation of this type of bomb needs no particular description, being essentially as hereinbefore described. In this and the other types of apparatus a removable receptacle 23 may be placed inside the removable chamber 22, for the purpose of receiving the chloride condensate. Receptacle 23 may for instance, be made of any suitable material that can be effectively sealed and does not react with the chloride when dry or not exposed; as of sheet iron. When the receptacle has received its charge of solidified chloride it may be removed from the apparatus and its top sealed. Thus we may conveniently make a package for shipment.

Figure 4:
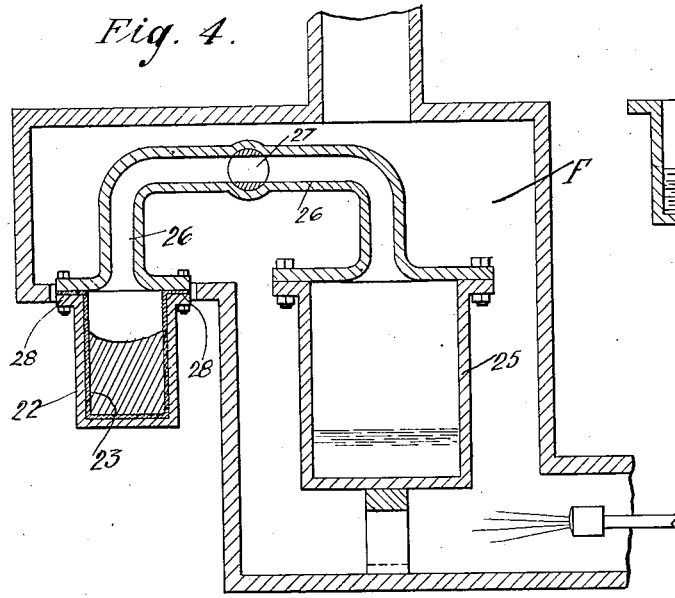
Fig. 4 is a vertical section showing another form of apparatus.

Fig. 4 shows another arrangement wherein the bomb is stationarily mounted in the furnace F. Here the main chamber 25 and the condensate receiving chamber 22 are connected by a pipe or conduit 26 controlled by a valve 27. Chamber 22 is permanently outside furnace F; and may be constructed as hereinbefore described, so as to be removable at 28 from the connecting conduit 26; and may also contain the receptacle 23 as before described. In this form of apparatus valve 27 is closed while the heating, vaporizing and liquefying step is going on; and when a sufficient time has been allowed, then valve 27 is opened and the vapor condenses to liquid and then solidifies in receptacle 23. In the operation of all the forms of apparatus, it will be understood that in the first stage there is equilibrium established between vapor and liquid; whereas in the second stage this equilibrium is disturbed by the fact that the condensate receiving chamber is cooler than the heating chamber, so that the vapor condenses either immediately or eventually to a solid cake, more vapor coming off the liquid in the hot chamber until the charge is exhausted. In this last described form the opening of valve 27 may temporarily reduce the vapor pressure, which is however, built up again by the continuous supply of heat at the maintained furnace temperature; so that the chloride then goes through the same phases as before described and is deposited in a solid cake. This, however, is provided that the temperature of the product receiving chamber is not so low as to cause condensation of the vapor while still in suspension, if a solid cake is desired. I stated before that it is necessary that the chloride be first condensed to a liquid body in order to subsequently solidify to a solid cake.

Figure 5:
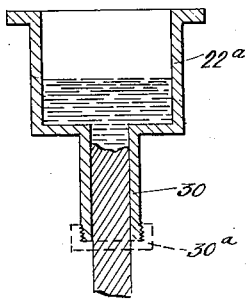
Fig. 5 is a detailed section showing a modification that may be used in the form of apparatus shown in Fig. 4, Fig. 2 or Fig. 6.

A modification applicable to any of the forms of apparatus is shown in Fig. 5. Here the chamber $22^a$ is shown as having an outlet tube 30 at its bottom. As the chloride condenses in the chamber $22^a$, first to a liquid, the pressure of the vapors will force it out through the discharge tube 30, the liquid solidifying as it cools during its passage through the discharge tube. Thus a solid mass of chloride will be forced out through the discharge tube and may be broken or cut off for packing in suitable containers. The size and length of discharge tube 30 is sufficient to give the proper restriction and create sufficient friction so that the interior pressure will move it out slowly as the liquid chloride accumulates above in chamber $22^a$; and the temperature maintained at chamber $22^a$ and tube 30 is such that the chloride liquefies in chamber $22^a$ and solidifies while passing out through the discharge tube 30. The temperature in chamber $22^a$ and in tube 30 may easily be regulated by making the chamber and tube project more or less from the interior of the furnace, so that the chamber is at liquid temperature while the tube is at solidifying temperature. A cap $30^a$ may be put over the end of tube 30 at the start and taken off when the tube has filled with the solidified chloride.

Figure 6:
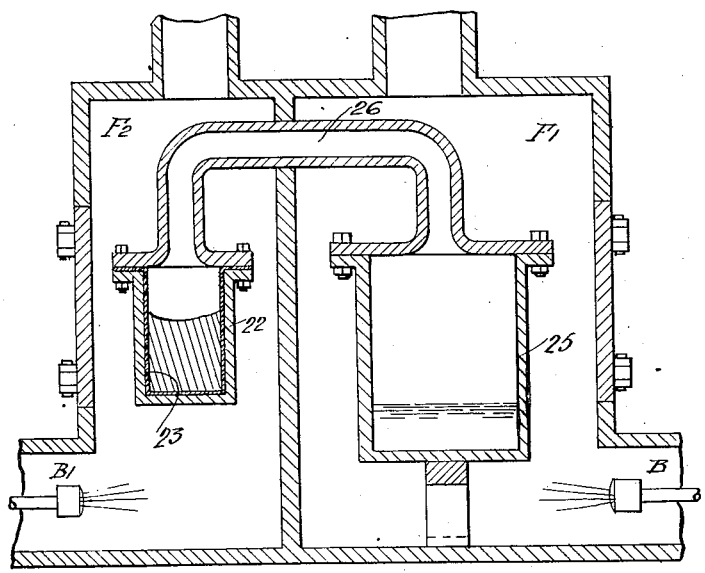
Fig. 6 is a vertical section showing another form of apparatus.

In Fig. 6 we show another form in which the main chamber 25 of the bomb is located in one furnace $F^1$ while the condensate receiving chamber 22 is located in another furnace $F^2$, these two furnaces being heated by separate means, as indicated at B and $B^1$, and therefore being maintainable at different temperatures.

In the operation of this form of apparatus, after the proper charge has been put into chamber 25 then furnace $F^1$ and chamber 25 are brought to a temperature of say 250 to 275° C.; and at the same time, or a little sooner, furnace $F^2$ and chamber 22 are brought to a temperature of say, somewhat over 350° C. (These temperatures are all approximate. This will prevent the condensation of chloride vapors in chamber 22 during the step of volatilization and liquefaction. The temperature in furnace $F^2$ is lowered to somewhat below the temperature of furnace $F^1$, so that the chloride will vaporize over into chamber 22 and condense there in liquid form; and then when the temperature of chamber 22 is lowered more the liquid will solidify. By first bringing the temperature of chamber 22 down to something below that of chamber 25 but above the temperature of the triple point, distillation into chamber 22 and condensation first in the liquid state is assured. During the liquid condensation period the temperature in 25 may be raised to say 350° C. so as to prevent any possibility of crystallization in the connecting tube. Then, during the solidification step, when the chamber 22 is brought down to below the melting point (usually in practice to normal room temperature or thereabouts), the temperature in chamber 25 may be maintained at about its original temperature of say 250° C. It will be seen that the methods we have now described involve, preferably, the heating of aluminum chloride to such a temperature and under such a pressure as will cause the body of the aluminum chloride to be held in liquid state. Then we have explained how we may distill over the vapors, and by slightly cooling those vapors cause a body of liquid condensate to be formed, which liquid condensate afterwards further cools and solidifies. Now this second formed body of liquid is also held in liquid state by the vapor presssure. Consequently, one aspect of our process is the holding of a body of aluminum chloride or the like in liquid state by the proper application of temperature and pressure, and solidification from the liquid state. Now, instead of solidifying from a liquid body that has been formed by condensation from vapors, we may solidify directly from the original liquid body, holding that liquid body under the requisite pressure to keep it in liquid state, while cooling it slightly to cause it to go in solid state. This particular procedure may be effectively used where we desire only to solidify aluminum chloride or the like. Where it is desired to purify at the same time, it is preferable to form the body of liquid by distillation.

In carrying out solidification directly from the original liquid body, it is of course not necessary that the chloride be distilled over from one end of the bomb to the other. Consequently, apparatus for this particular type of the process may be merely a bomb with a single chamber, in which the chloride is heated under its own vapor pressure and caused to vaporize and liquefy as before described, and then the bomb is removed from the furnace, and the temperature of the furnace lowered, so as to cause the liquid to cool to solid form. As we have before said, the process may be used for solidifying a mixture of two or more chlorides. This is especially applicable to a mixture of such chlorides as aluminum and ferric chlorides, both of which under normal atmospheric pressure pass directly from the solid to vapor state when heated. And, although these two chlorides, separately, have different liquefying and vaporizing temperatures; when mixed together, they have a common modified liquefying and vaporizing characteristic. Their combined characteristics are similar to those here described for aluminum chloride, although the controlling temperatures and pressures are somewhat different.

The final product of this process is aluminum chloride in solid and anhydrous form, which is most suitable for shipping and capable of keeping indefinitely without deterioration when not exposed to atmosphere or moisture.

Having described a preferred form of our invention, we claim:

1. The process of solidifying aluminum chloride, that includes heating it to a temperature above its triple point and under a pressure sufficient to restrict vaporization and hold the body of aluminum chloride in liquid form, and then reducing the temperature of the vapor without correspondingly reducing the pressure.

2. The process of solidifying aluminum chloride, that includes heating it to a temperature above its triple point and under a pressure sufficient to restrict vaporization and hold the body of aluminum chloride in liquid form, and then reducing the temperature of the vapor to a point below the liquefying point of aluminum chloride at that pressure, without correspondingly reducing the pressure.

3. The process of solidifying aluminum chloride, that includes heating the chloride under its own vapor pressure to a point of temperature where the vapor pressure and temperature cause the chloride to pass from the solid to the liquid state, then cooling the vapors sufficiently to cause them to pass through the liquid to the solid state.

4. The process of solidifying aluminum chloride, that includes heating the chloride under its own vapor pressure to a point of temperature where the vapor pressure and temperature cause the chloride to pass from the solid to the liquid state, then cooling the vapors sufficiently to permit distillation and so that they pass from the vapor state through the liquid to the solid state.

5. The process of solidifying aluminum chloride, that includes heating the chloride under its own vapor pressure to a point above its triple point, thereby causing the body of the chloride to be held in liquid state, then, while maintaining the temperature of the body of liquid, distilling the vapors over and cooling them to a point below the melting point of the chloride.

6. The process of solidifying aluminum chloride, that includes heating the chloride under its own vapor pressure to a point above its triple point, thereby causing the body of the chloride to be held in liquid state, then, while maintaining the temperature of the body of liquid, distilling the vapors over and cooling them first to a temperature below the vaporizing temperature and above the liquefying temperature, and then to a temperature below the liquefying temperature.

7. A process of solidifying aluminum chloride in an apparatus that has two communicating chambers independently heated, the charge of aluminum chloride being placed in one chamber; that includes maintaining the said chamber with its charge at a temperature above the triple point of the chloride and under its own vapor pressure, thereby causing the body of the chloride to be maintained in liquid form, and maintaining the other chamber at a temperature below the liquefying temperature of aluminum chloride at the pressure maintained, so that the vapor distills over into the second mentioned chamber and condenses therein.

8. A process of solidifying aluminum chloride in an apparatus that has two communicating chambers independently heated, the charge of aluminum chloride being placed in one chamber; that includes maintaining the said chamber with its charge at a temperature above the triple point of the chloride and under its own vapor pressure, thereby causing the body of the chloride to be maintained in liquid form, and meanwhile maintaining the other chamber at a temperature not less than that maintained in the first mentioned chamber, then lowering the temperature of the second mentioned chamber to a point below the temperature of the first mentioned chamber but above the liquefying temperature of the chloride at the pressure maintained, thereby causing distillation of the chloride into the second mentioned chamber and condensation in liquid form, and then lowering the temperature of the second mentioned chamber to a point below the melting point of the chloride to solidify the liquid condensate.

9. A process of solidifying aluminum chloride in an apparatus that has two communicating chambers independently heated, the charge of aluminum chloride being placed in one chamber; that includes maintaining the said chamber with its charge at a temperature above the triple point of the chloride and under its own vapor pressure, thereby causing the body of the chloride to be maintained in liquid form, and meanwhile maintaining the other chamber at a temperature not less than that maintained in the first mentioned chamber, then lowering the temperature of the second mentioned chamber to a point below the temperature of the first mentioned chamber but above the liquefying temperature of the chloride at the pressure maintained, thereby causing distillation of the chloride into the second mentioned chamber and condensation in liquid form, meanwhile maintaining the first mentioned chamber at a higher temperature than before, and then lowering the temperature of the second mentioned chamber to a point below the melting point of the chloride to solidify the liquid condensate.

10. The process of solidifying aluminum chloride that includes heating it to a temperature above its triple point and under a pressure sufficient to restrict vaporization and hold at least a part of the aluminum chloride in liquid form and then reducing the temperature of the liquid to solidify it while maintaining the pressure.

11. The process of solidifying aluminum chloride, that includes subjecting the aluminum chloride to such a temperature and pressure as to cause it to assume liquid form, and then solidifying the liquid by reducing the temperature without correspondingly reducing the pressure.

12. The process of forming a homogeneous mixture of two or more chlorides, that includes subjecting them together to such a temperature and pressure as to cause them to be held in liquid form, and then reducing the temperature of the liquid without correspondingly reducing the pressure, thereby causing the liquid to solidify.

13. The process of producing a homogeneous mixture of two or more chlorides, that includes heating a mixture of the chlorides to a temperature above their triple point and under a pressure sufficient to restrict vaporization and hold the body of chlorides in liquid form, and then reducing the temperature of the vapors without correspondingly reducing the pressure.

In witness that we claim the foregoing we have hereunto subscribed our names this 14th day of May, 1923.

CLIFFORD W. HUMPHREY
DONALD S. McKITTRICK.